United States Patent [19]

Clark et al.

[11] Patent Number: 4,690,519
[45] Date of Patent: Sep. 1, 1987

[54] ZOOM MICROSCOPE HAVING A CRANK AND LINKAGE MECHANISM

[75] Inventors: James A. Clark, Honeoye Falls; Henry J. Emmel, Rochester, both of N.Y.

[73] Assignee: Bausch & Lomb Incorporated, Rochester, N.Y.

[21] Appl. No.: 735,412

[22] Filed: May 17, 1985

[51] Int. Cl.$^4$ .................. G02B 7/10; G02B 21/22
[52] U.S. Cl. .................. 350/515; 350/519; 350/429
[58] Field of Search .............. 350/515, 519, 570, 429

[56] References Cited

U.S. PATENT DOCUMENTS

| | | | |
|---|---|---|---|
| 3,051,048 | 8/1962 | Mahn | 350/429 |
| 3,166,629 | 11/1965 | Walter | 350/519 |
| 3,405,991 | 10/1968 | Seedhouse | 350/515 |
| 3,516,732 | 6/1970 | Clark | 350/429 |

FOREIGN PATENT DOCUMENTS

| | | | |
|---|---|---|---|
| 1308193 | 9/1962 | France | 350/429 |
| 164311 | 12/1981 | Japan | 350/429 |
| 380404 | 9/1964 | Switzerland | 350/429 |

*Primary Examiner*—Jon W. Henry
*Attorney, Agent, or Firm*—John Norton

[57] ABSTRACT

The mechanism for moving the lens assemblies mounted to support rods in a variation power microscope includes a crank shaft having a pair of opposed arms. The lens assemblies are connected to the crank arms by linkages. The lens assemblies are biased to the support rods by resilient member. At least one of the crank arms may incorporate a motion correcting surface which cooperates with a cam follower fixed to the associated linkage to vary the length of the linkage. The lens assemblies may further include arms for stabilizing guiding them along the support rods. Still further, the mechanism may include a device for controlling the rotation in either direction of the crank shaft. Additionally, the lens assemblies may be adjustably fixed to the linkages.

19 Claims, 10 Drawing Figures

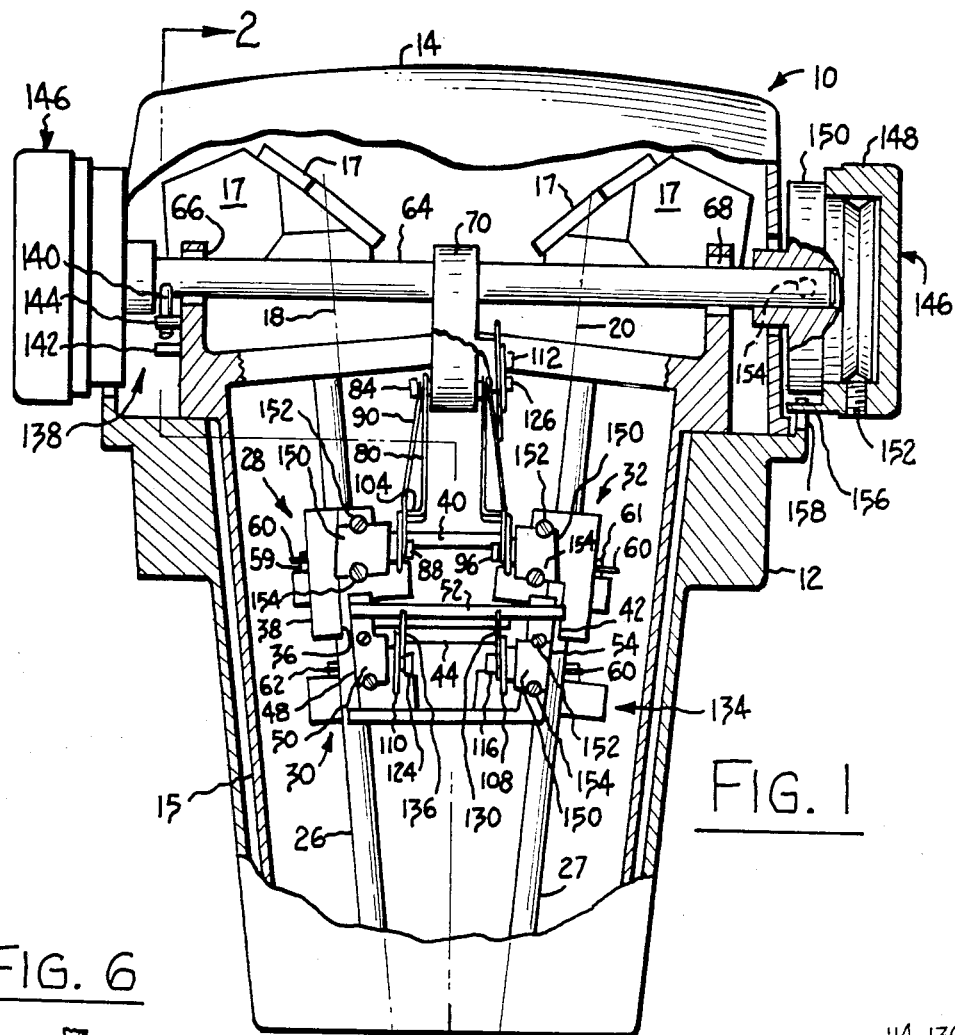
FIG. 1
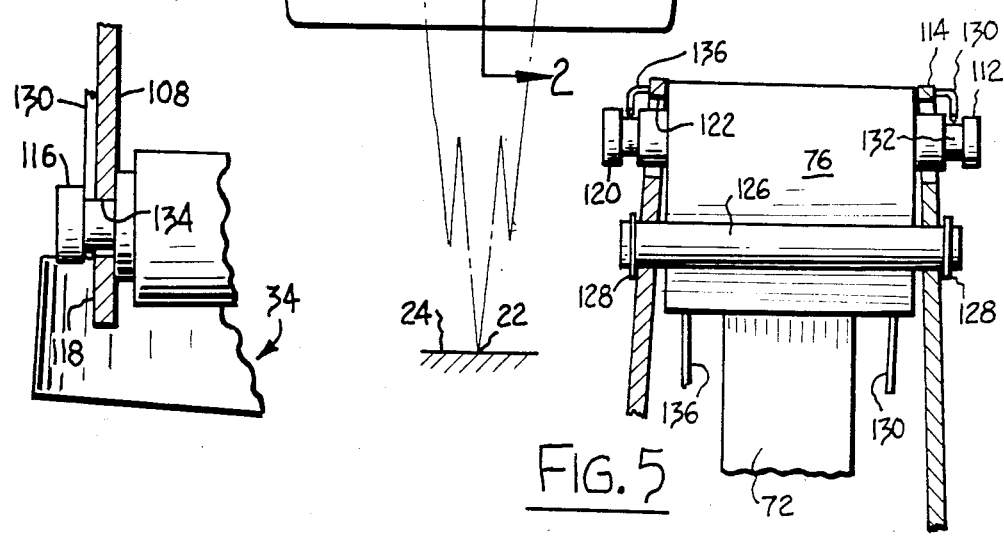
FIG. 6
FIG. 5

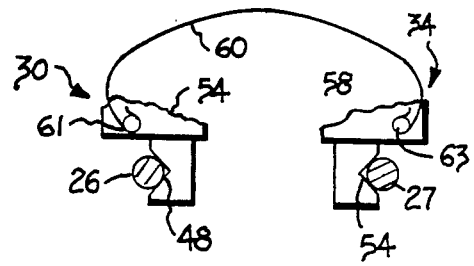
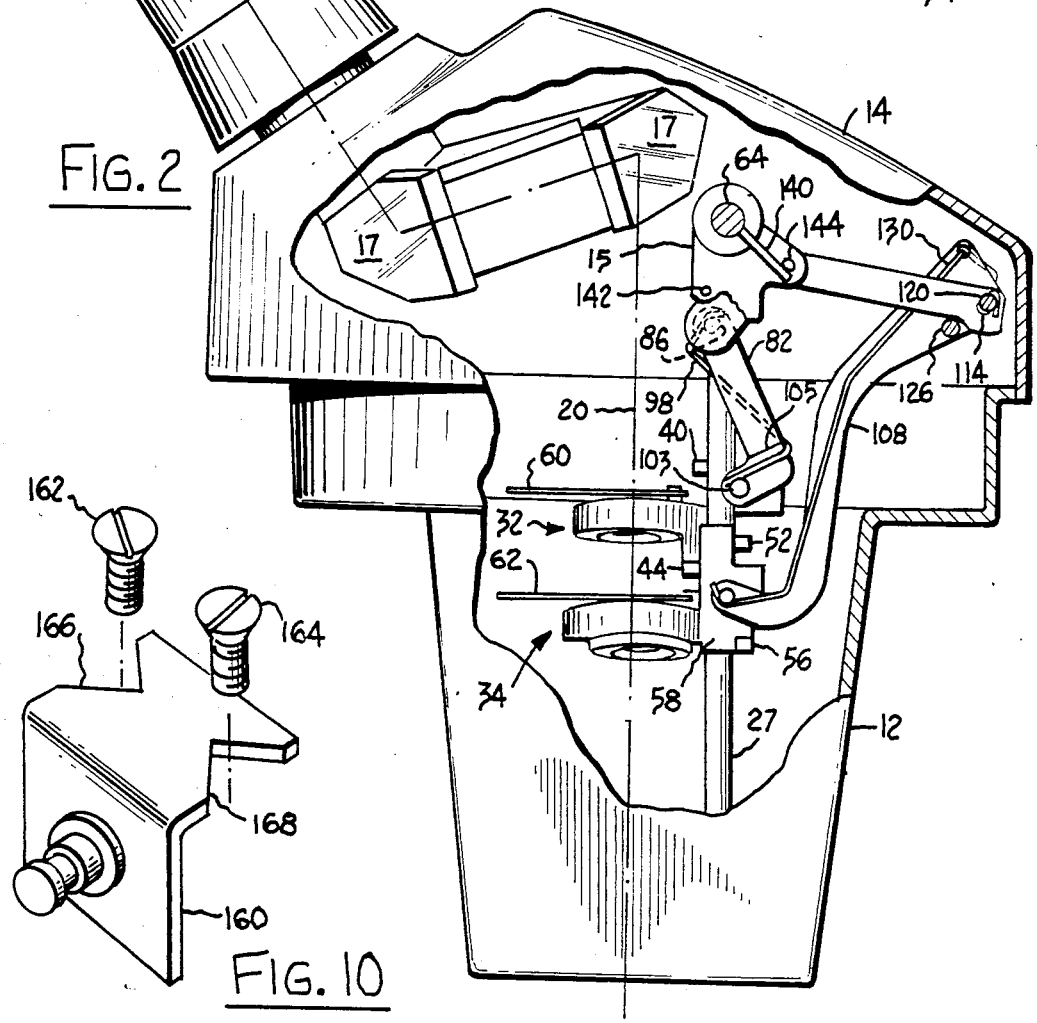

ZOOM MICROSCOPE HAVING A CRANK AND LINKAGE MECHANISM

BACKGROUND OF THE INVENTION

The present invention is directed toward optical instruments, particularly stereoscopic microscopes and, more particularly, the apparatus for mounting and moving the lenses to achieve continuously varying magnification.

DESCRIPTION OF THE PRIOR ART

Prior art stereo microscopes having continuously variable magnification systems utilize an adjusting mechanism which, typically, consists of a pair of rotatably mounted and splayed apart support shafts, each having a pair of cam slots formed therein. The support shafts are connected via appropriate apparatus, such as gearing, to a rotatable adjusting shaft. Complimentary pairs of lens cells are coupled by cam followers to each of the cam slots, such that rotation of the adjusting shaft causes the lens cells to move linearly in either direction along the support shafts. The distance moved by each lens cell is a function of the shape of the cam slot to which each respective cam follower is coupled.

Examples of variable power stereomicroscopes such as are described above, are disclosed in the following U.S. Pat. Nos.: 2,942,519 issued June 28, 1960 to O. W. Boughton et al; 3,057,259 issued Oct. 9, 1962 to R. F. Schuma; 3,061,801 issued Oct. 30, 1962 to O. W. Boughton et al; 3,502,392 issued Mar. 24, 1970 to R. M. Muller; and 3,510,202 issued May 5, 1970 to O. W. Boughton.

A variation of the microscopes described above is found in U.S. Pat. No. 3,405,991, issued Oct. 15, 1968 to F. A. Seedhouse. In this patent, a zoom stereoscope is described which has complimenting lens cells that are slidably received on two pairs of parallel support rods. Each pair of support rods is angularly displaced to the other pair of support rods. A rotatable, centrally located cam shaft includes a pair of cam slots to which the lens cells are coupled by cam followers. When the cam shaft is rotated, each individual lens cell is moved linearly a predetermined amount.

The stereo microscopes just described suffer from several design and cost problems. First, each utilizes a spiral cam slot formed on a cam shaft. It is well known that forming precision spiral cam slots is an expensive and hard to control procedure requiring expensive machinery. Also, any positioning errors introduced by the cam and follower arrangement may render the resolution of the optical system unacceptable. These errors may occur because of faulty manufacturing, wear to the slot or follower, or both.

Second, the above described instruments incorporate a gear drive system between the adjusting shaft and the cam or cams. The precision optical requirements of the instrument demand the use of precision gearing to minimize backlash, which further increases the costs.

Third, the guide rods on which the lens cells slide must be precision ground to ensure accuracy. This requires additional manufacturing expense.

Fourth, in each of the instruments described above, one precision member (cam follower) is mounted for sliding engagement in a second precision member (cam slot). Thus, unless the surfaces are treated with a special lubrication or coating, or a low friction bearing is affixed to the cam follower, an unacceptable amount of friction between the surfaces will be present.

Mr. J. A. Clark, co-inventor of the present invention, recognized the short-comings of the cam and follower arrangement and the advantages of a simple crank and link mechanism for moving a plurality of lenses or lens cells along a straight path, such as is required in a monozoom system. The advantages of the crank and link mechanism are described in U.S. Pat. No. 3,516,732, which issued on June 23, 1970. The disclosed mechanism comprises a crank and link mechanism which provides a zoom action in a monozoom system of up to 5:1 magnification range. At the time the work was accomplished, this ratio was considered quite high. However, as uses of zoom microscopes increased, it became evident that ratios greater than 5:1 would be required. As the zoom ratios became greater, it was thought that a crank and link mechanism, such as described could not be utilized, because an unacceptable out of focus condition was observed. This was due to the fact that the excursion of the crank and link mechanism could not be matched perfectly to the specific parameters of the optics. That is, during certain portions of the linear movement of the zoom lenses induced by the movement of crank and link mechanism, the system loses focus and the image blurs.

The invention, as described and set forth in detail hereinafter, overcomes the problems encountered by the devices described above, is economical to manufacture and permits rapid change in magnification.

SUMMARY OF THE INVENTION

The present invention provides a variable power optical instrument which incorporates a crank and link mechanism for accurately controlling the movement of matched pairs of lenses within the zooming range of the instrument. The instrument may include a pair of angularly displaced support rods to which cooperating pairs of lens cell assemblies are mounted. The pairs of lens cell assemblies are coupled together by links which are actuated by a rotatable crank shaft. A cam surface is formed on the crank which engages a cam follower on one set of the links. The length of the links may be, therefore, effectively altered to compensate for, and correct, an out of focus condition.

The rotatable crank shaft includes a pair of knobs which incorporate adjustable stop mechanisms to limit the amount of rotation available, thereby limiting the linear distance traveled by the individual lens cells.

A spring member holds each of the pair of lens cells assemblies in positive contact against the guide rods to which they mount. Each lens assembly includes a stabilizer arm to stabilize and guide the assembly on the support rod.

Further, the spring members are mounted cooperatively between the link pivot at the lens cell assembly and the link pivot at the crank to thereby load the lens cell to the crank.

The links are coupled to the crank and to the lens cell assemblies in such a manner to allow for the links to pivot toward and away from each other as the lens cell assemblies make their excursions up and down the angularly displaced guide rods.

BRIEF DESCRIPTION OF THE DRAWINGS

FIG. 1 is a partially sectioned front view of a variable power stereo microscope incorporating the crank and link mechanism according to the present invention;

FIG. 2 is a view taken along line 2—2 of FIG. 1;

FIG. 5 is an enlarged partial bottom plan view of the long crank arm and linkages;

FIG. 6 is an enlarged partial view showing the connection of one of the long arm linkages to one of the lower lens cells assemblies;

FIG. 9 is a partially sectioned top plan view of the lower lens cell assemblies and associated biasing spring; and FIG. 10 is an exploded perspective view of one of the brackets for securing the pivot pins to the lens carriers.

DETAILED DESCRIPTION OF THE PREFERRED EMBODIMENT

Figure 3:
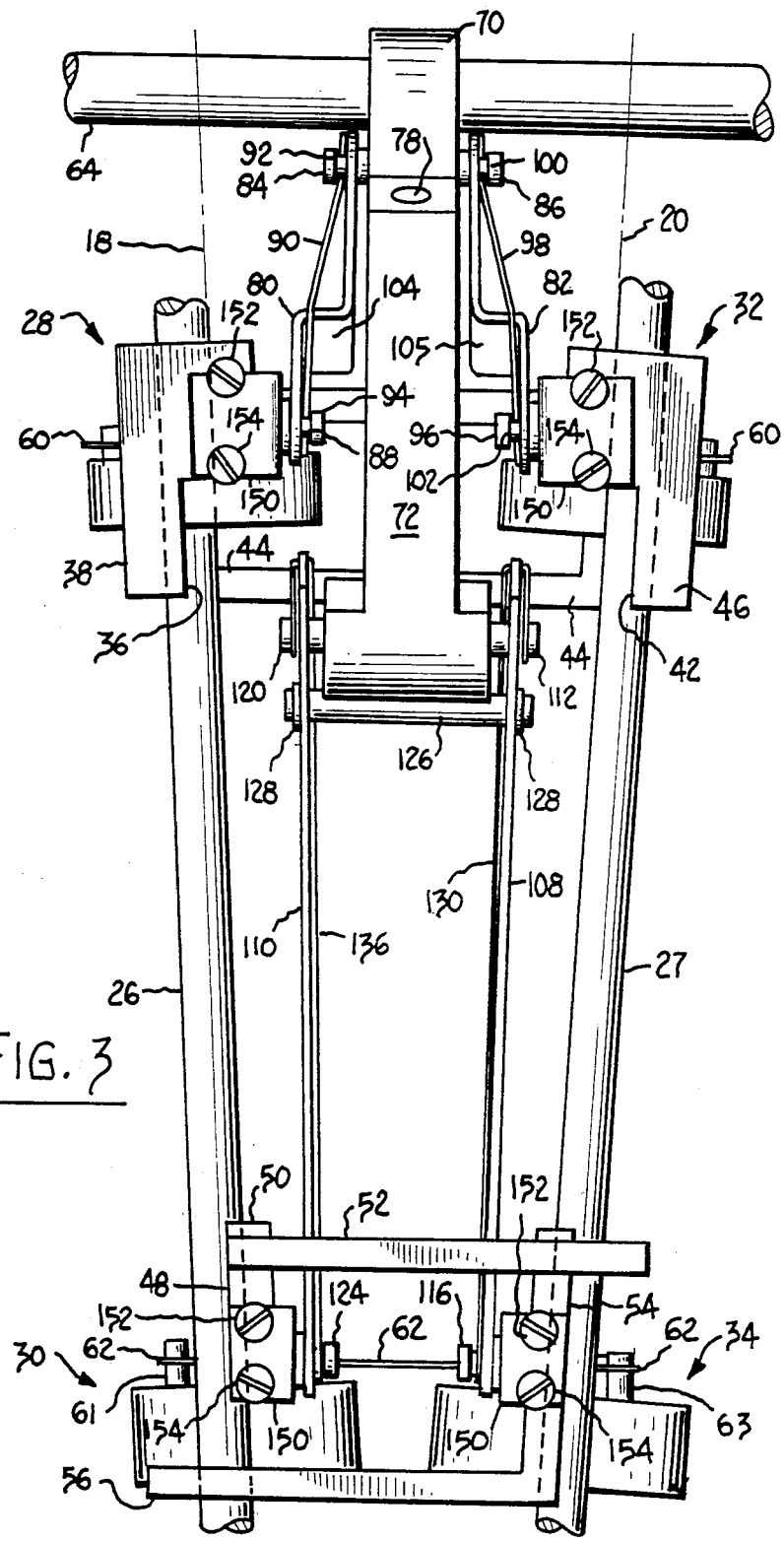
FIG. 3 is an enlarged partial front view, similar to FIG. 1, showing the crank and link mechanism in a second position.

Optical instrument 10, a variable power stereo microscope pod in the preferred embodiment, generally comprises a lower housing 12, an upper housing 14 and a chassis 15, all of which are coupled together by conventional methods. A pair of conventional pivotable binocular eyepieces 16, one of which is shown in FIG. 2, are mounted to upper housing 14. The eyepieces are adjustable to compensate for focusing differences between eyes and to vary the interpupillary distance. A plurality of mirrors 17 are mounted to chassis 15, in any convenient conventional manner, in alignment with eyepieces 16 and along optical axes 18 and 20, which axes are inclined with respect to one another so as to converge at a point 22 on an object plane 24, as best seen in FIG. 1.

The apparatus to support and position the moveable optics along axes 18 and 20 includes a pair of guide rods 26 and 27 mounted to chassis 15. As best seen in FIGS. 1 and 3, guide rod 26 supports a pair of complimenting upper 28 and lower 30 zoom lens assemblies which are slidably mounted for linear movement therealong. Guide rod 27 has upper 32 and lower 34 zoom lens assemblies similarly mounted thereto.

As best illustrated in FIGS. 3 and 9, lower lens assembly 30 is mounted to the inner portion of guide rod 26 by way of a linear groove 48 formed longitudinally in the lens assembly carrier 50. To prevent rotation of carrier 50 about rod 26, a stabilizing arm 52 extends from carrier 50 to contact the opposing guide rod 27. Similarly, lower lens assembly 34 is mounted by way of a linear groove 54 to the outer portion of guide rod 27. To prevent rotation, an arm 56 extends from the lens assembly carrier 58 to contact guide rod 26.

Upper zoom lens assembly 28 is mounted to the outer portion of guide rod 26 via linear groove 36 which is formed longitudinally in lens assembly carrier 38. As with carriers 50 and 58, to prevent rotation relative to rod 26, a stabilizing arm 40 (best illustrated in FIGS. 1 and 2) extends from lens carrier 38 to contact opposing guide rod 27 adjacent upper zoom lens assembly 32, which is mounted thereto via linear groove 42. A stabilizing arm 44 extends from lens carrier 46 to contact the opposing guide rod 26. Stabilizing arms 40 and 44 are oppositely disposed from stabilizing arms 52 and 56 on guide rods 26 and 27 to enable the upper and lower lens assemblies to be brought close together, as illustrated in FIG. 1.

As best seen in FIGS. 2 and 9, linear grooves 48 and 54 are biased into, respectively, guide rods 26 and 27 by horseshoe shaped spring 62, which is fixed between lens assembly carriers 50 and 58 via pins 61 and 63. The force exerted by spring 62 not only forces linear grooves 48 and 54 into engagement with rods 26 and 27, it exerts a torque on both carriers 50 and 58 which forces the free end of stabilizer arm 52 into engagement with rod 27 and the free end of stabilizer arm 56 into engagement with rod 26. Similarly, upper zoom lens assemblies 28 and 32 are biased along, respectively, linear grooves 36 and 42 to guide rods 26 and 27 by horseshoe shaped spring 60 which is fixed between carriers 38 and 46. The stabilizing arms 40 and 44 counteract the torque induced by spring 60 and, thus, prevent rotation of the lens assemblies 28 and 32 about the rods.

Figure 4:
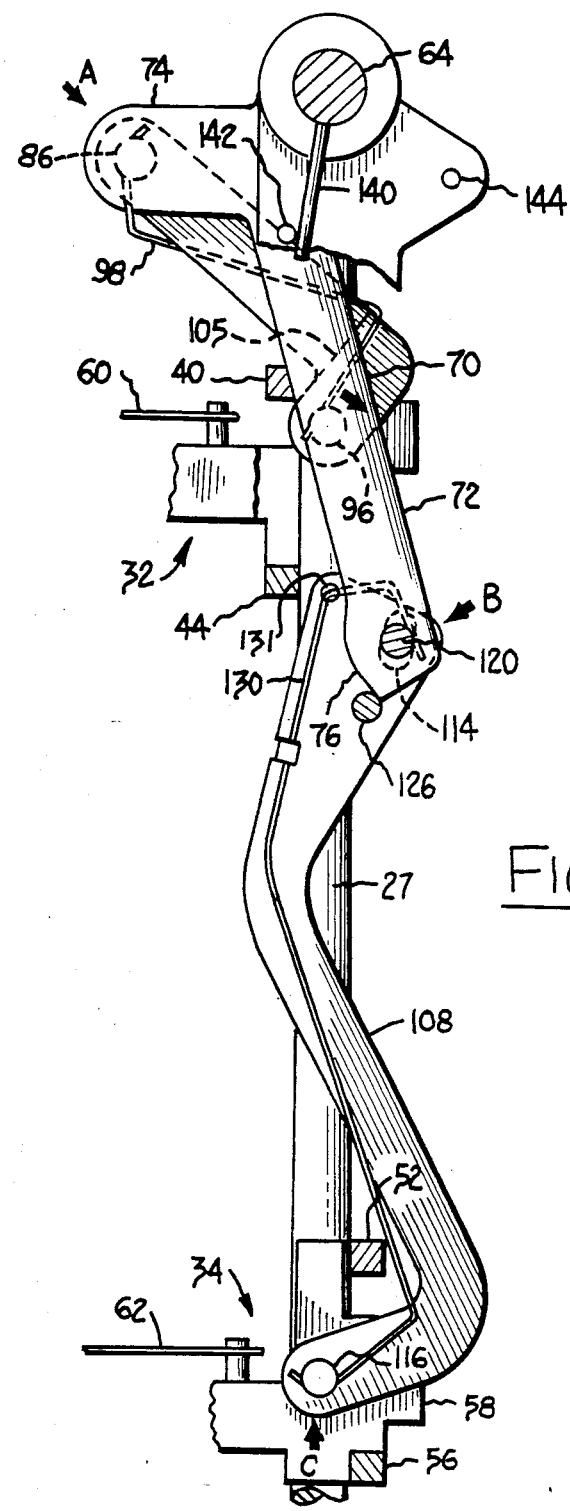
FIG. 4 is a right side plan view of the crank arm and link mechanism shown in FIG. 3.
Figure 7:
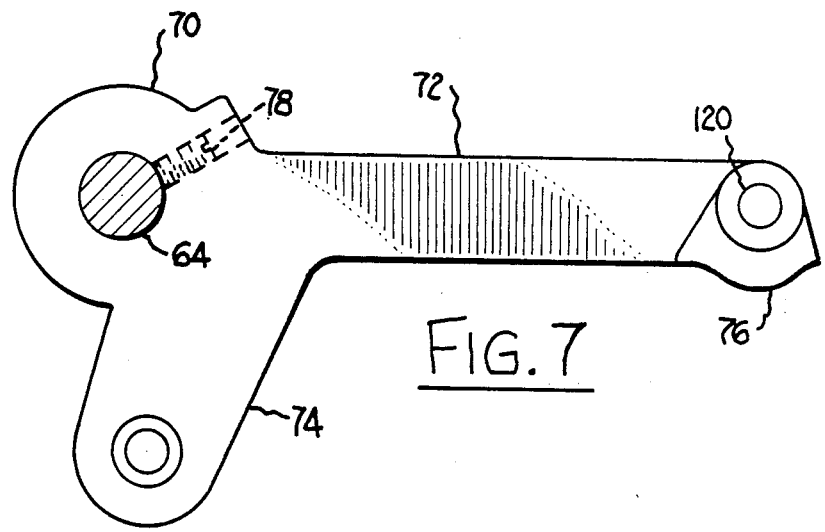
FIG. 7 is a side view of the crank.

The zoom lens supporting and positioning apparatus also includes an adjusting shaft 64 rotatably mounted in chassis 15, by bearings 66 and 68, generally transversely to guide rods 26 and 27. As best illustrated in FIGS. 2, 4 and 7, attached to the adjusting shaft 64 is a crank 70 having a long arm 72 and a short arm 74. Long arm 72 has a cam surface 76 formed thereon. The crank is fixably secured to shaft 64 by, for instance, set screw 78.

As best seen in FIGS. 3 and 4, a first pair of crank linkages 80 and 82 is pivotably mounted to short crank arm 74 by respectively, crank pins 84 and 86. Linkage 80 is pivotally connected at its opposite end, by crank pin 88, to upper zoom lens assembly carrier 38. A spring 90 has one end fitted to groove 94 of crank pin 84 and its other end fitted in groove 94 of crank pin 88. Similar to linkage 80, linkage 82 is pivotally connected to upper zoom lens assembly carrier 46 by crank pin 96. A second spring 98 has one end fitted to groove 100 in crank pin 86 and its opposite end is received in groove 102 of pin 96. As is also seen in FIGS. 3 and 4, linkages 80 and 82 have, respectively, offset portions 104 and 105 over which each respective spring passes. This arrangement permits springs 90 and 98 to exert forces, in the general direction indicated by arrows A in FIG. 4, on pins 86 and 96 and, not shown, on pins 84 and 88. The springs also automatically compensate for wear between the connecting parts by pulling the pins and apertures together to insure that each pin is always loaded to one side of the associated aperture by a force greater than the friction between the parts. It will be appreciated from the drawings, that springs 90 and 98 also act to hold the linkages 80 and 82 on the pins. The significance of this will be explained hereinafter.

The long crank arm 72 is pivotally connected to lower zoom lens carriers 50 and 58 by crank linkages 108 and 110, as best seen in FIGS. 3, 4, 5 and 6. Pivot pin 112 is received in elongated aperture 114 formed in one end of linkage 108. The opposite end of linkage 108 is affixed to pivot pin 116 by way of aperture 118, which is slightly larger in diameter than the pin. Pivot pin 120 is received in elongated aperture 122 of linkage 110. The opposite end of linkage 110 is affixed to pivot pin 124 via a slightly oversized aperture, not shown. A cam follower 126 is fixed, by any convenient method, such as C-clips 128, between linkages 108 and 110 adjacent pins 112 and 120 so as to be in intimate contact with cam surface 76 formed on long crank arm 72.

A spring 130 is adapted at one end to be received in and bear against groove 132 of crank pin 112. As best illustrated in FIGS. 3 and 4, spring 130 passes through hole 131 of link 108. The opposite end of spring 130, as best illustrated in FIG. 6, is received in and bears against groove 134 of pivot pin 116. Spring 136 is similarly configured and affixed between crank pin 120 and pivot pin 124 of lens assembly carrier 56. By referring in FIG. 4, it will be seen that the shape of spring 130 and its attachment to link 108, permits it to exert a force in the direction indicated by arrow B against pin 112 and, as indicated by arrow C, a force against pin 116. Spring 136 exerts the same forces on, respectively, pins 120 and 124. Accordingly, it will be readily appreciated, that springs 130 and 136 force pins 112 and 120 into positive engagement against slots 114 and 122 while simultaneously holding pins 116 and 124 in positive engagement within the apertures 118, such as is shown in FIG. 6.

A travel stop mechanism 138 is secured to the adjusting shaft 64 and chassis 15, as best seen in FIGS. 1, 2 and 4. The mechanism comprises a rod 140 which extends perpendicularly from adjusting shaft 64 between a pair of angularly displaced stop pins 142 and 144 which extend from the chassis 15.

As best illustrated in FIG. 1, a pair of magnification adjusting knob assemblies 146 are each appropriately fixed to adjusting shaft 64, one at each end thereof. Each knob assembly 146 comprises a wheel 148 which is slip fit over a hub 150 and adjustably secured thereto by set screw 152. Hub 150 is, in turn, secured to shaft 64 by set screw 154. A tab 156, (one of which is shown) extends from each of the wheels 148 to engage stop lugs 158 (one of which is shown) formed on chassis 15 upon a predetermined degree of rotation of shaft 64, as explained hereinafter.

In operation, housing 12 is mounted to an appropriate mount (typically a stand) in any well known manner such that, as explained above, optical axes 18 and 20 converge at focal point 22 on the object plane 24. The stand includes an adjusting mechanism (not shown) which enables the operator to move the entire microscope pod either up or down, to bring the object being viewed into focus. Once this is accomplished, the the zooming capabilities of the instrument 10 may be brought into play to vary the magnification of the object being viewed.

Once the focus has been accomplished by use of the previously described stand adjustment mechanism, the adjusting shaft 64 is rotated by either one, or both, of knobs 146 to rotate long and short crank arms 72 and 74. As illustrated in FIGS. 1 and 2, adjusting shaft 64 is in its upper limit of rotation as dictated by stop rod 140 physically engaging stop pin 144. In this position, long crank arm 72 and lens assemblies 30 and 34 are at their upper limits, while short crank arm 74 is at its lower limit. It will be evident that, by rotating shaft 64 clockwise from the position shown in FIG. 1, it will reach its lower limit of rotation, as shown in FIG. 4 as stop pin 142 contacts stop rod 140. In this position, long crank arm 72 and short crank arm 74 are at their, respectively, lower and upper limits.

The long crank arm 72 and lower lens assemblies 30 and 34 are coupled together by crank linkages 108 and 110, as previously described, such that rotation of the crank arm 72 is translated into linear movement of the lower lens assemblies 30 and 34 along guide rods 26 and 27. The short crank arm 74 and upper lens assemblies 28 and 32 are similarly coupled together for linear movement, in the opposite direction to lens assemblies 30 and 34, along guide rods 26 and 27 by linkages 80 and 82. Accordingly, rotation of the crank shaft 70 in one direction moves the upper (28 and 32) and lower (30 and 34) zoom lens assemblies away from each other, while rotation in the opposite direction brings them closer together.

Figure 8:
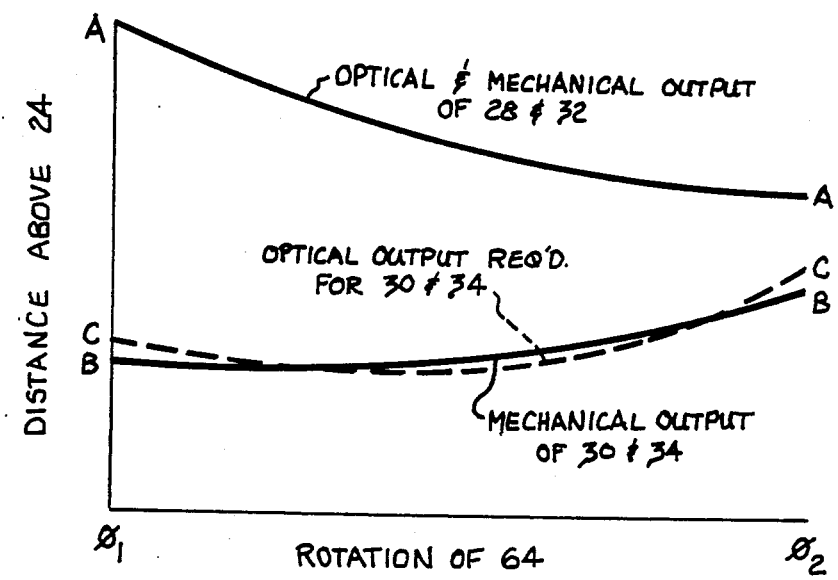
FIG. 8 is a graph depicting the relationship between the optical and mechanical output curves for the lenses supported by the upper and lower zoom lens assemblies.

As those skilled in the art will appreciate, the positions above the object plane imparted to the lenses supported by the upper and lower zoom assemblies, by a crank and linkage arrangement may not be sufficiently close to the positions above the object plane necessary to maintain the image in focus throughout the zoom range. That is, over the entire range of travel of the zoom assemblies certain out of focus conditions appear which cannot be compensated for by two dimensional linkage movement. This is evident by referring to FIG. 8 which is a graph representative of the relationship between the optical and mechanical output curves for the lenses supported by the upper and lower zoom lens assemblies. As those skilled in the art will appreciate, the optical and mechanical curves of the zoom lens supported by assemblies 28 and 32, as represented by curve A—A, are matched. However, the optical curve C—C and the mechanical curve B—B for the zoom lens supported by assemblies 30 and 34 are not sufficiently matched. For example, as adjusting shaft 64 is rotated through the angle represented by $\phi_1 - \phi_2$, the upper zoom lenses move, by crank 74 and linkages 80 and 82, through the required curve, as represented by curve A—A. For each height of the upper zoom lens above the object plane 24, as represented on the curve A—A, there is a corresponding height of the lower zoom lenses above the object plane 24, as represented by the curve C—C, in order to maintain the focus for the optical system. In the preferred embodiment, to sufficiently match curve B—B with curve C—C, the effective length of the linkages 108 and 110 is continuously altered, as explained below.

As previously described, a correcting cam 76 is constructed on long crank arm 72. The surface of the cam 76 is calculated to, in conjunction with the movements of linkages 108 and 110, sufficiently correct the focus deviation between the mechanical and optical outputs to maintain focus. Cam follower 126, which is fixed between linkages 108 and 110, is biased against the cam surface 76 by springs 130 and 136. This biasing arrangement, along with elongated apertures 114 and 122, permit the linkages to oscillate back and forth along, respectively, pins 112 and 120, thereby effectively altering their length to enable the lower zoom lenses to follow curve C—C.

As is evident from the drawings, as the upper (28 and 32) and lower (30 and 34) lens assemblies are moved from one position to another along guide rods 26 and 27, the linkages 80, 82 and 108, 110 must be capable of pivoting toward and away from each other as well as about the axes of the pivot pins. In order to accomodate for this, the apertures in linkages 80, 82, 108 and 110 are slightly larger in diameter than the pivot pins to which they mount and, thus, act as spherical joints. As previously explained, the springs 90, 98, 130 and 136 act as retainers in holding the linkages in place on the pins.

The amount by which the effective length of linkages 108 and 110 will have vary to maintain focus will depend, in the first instance, upon the minimum magnification and the zoom ratio. For a compact 6:1 zoom system, the surface of cam 76 is computer derived by considering a range of variables for: the relative angle between rods 26 and 27; the length of crank 74; the length of crank 72; the length of links 80 and 82; the variation in the effective length of links 80 and 82 due to relative motion in the plane of rods 26 and 27; the length of links 108 and 110 and the variation in effective length due to relative motion in the plane of rods 26 and 27; the location (X, Y and Z coordinates) of each of the pins relative to the front vertix of its associated lenses; the angle through which the cranks are rotated, as well as the starting and ending positions of the cranks; and the position of the axis of rotation relative to the object plane and the plane formed by the two optical axes.

As was previously described a travel stop mechanism 138 is incorporated to prevent the mechanism from being damaged by an operator trying to drive the lenses too far in either the up or down direction. However, within the maximum travel allowed by the travel stops, an arbitrary stop may be set by adjusting the knob assemblies 146. In order to accomplish this, it is only necessary for the operator to determine what the maximum and minimum magnifications are for the object being viewed. By simply setting the limits for the examination of one sample, the limits will be valid for the remaining similar samples. Thus, the object being examined is placed on the stage and the knob assemblies 146 rotated to bring the object into, for instance, the desired high magnification condition. The set screw 152 is loosened and the wheel 148 rotated until tab 156 bumps against lug 158. The set screw 152 is then retightened. The knob assemblies 146 are then rotated in the opposite direction until a desirable low magnification is obtained. The procedure would then be repeated on the opposite knob. Thus, fairly precise and repeatable magnification conditions for maximum and minimum may be simply and easily obtained.

As shown in FIGS. 1 and 3 the pivot pins are secured to assemblies 28, 30, 32 and 34 by way of angle brackets 160, as best shown in FIG. 10. Each bracket 160 is fixed to each of the individual lens carriers by flat head machine screws 162 and 164 which are received in opposed V-slots 166 and 168 formed in the bracket. In the process of focusing the instrument, it may be necessary to slightly adjust the position of any of the lens assemblies with respect to its partner on the support rod. To accomplish this adjustment it is only necessary to loosen one of the screws and then tightened the other. It is evident from FIG. 10 that the screws 162 and 164 have tapered heads. By loosening one and tightening the other, the taper on the underside of the screw being tightened is forced against the V-slot to which it is fitted, causing the bracket to move away from the screw being tightened and along the lens assembly in a linear direction. The distance between the lens assemblies, and therefore the focus, is accordingly adjusted.

It should be understood that the embodiment described in the above specification is given by way of example only and as such, may be modified without departing from the spirit or scope of the invention as set forth in the following claims.

We claim:

1. A variable power optical instrument comprising:
   (a) support means;
   (b) first and second support rods secured to said support means;
   (c) first and second lens carriers for supporting a pair of lenses and positioning said lenses along the optical axis of said instrument, each of said carriers including means for guiding said carriers along said first support rod and an arm secured to and extending therefrom for engaging said second rod;
   (d) means for biasing each of said carriers into engagement with both said first and said second support rods to prevent rotation of said carriers relative to said first rod;
   (e) means secured to said support means, for moving said first and second lens carriers along said optical axis; and
   (f) support means, slidably secured to said second rod, for supporting said biasing means, said biasing means being secured between said support means for supporting said biasing means and each of said carriers to bias each of said carriers into said first rod and said arms into engagement with said second rod.

2. The instrument as set forth in claim 1, wherein said biasing means is a pair of horseshoe shaped springs.

3. The instrument as set forth in claim 1, further including a second optical axis which converges with said optical axis, and wherein said bias supporting means includes third and fourth lens carriers for supporting a second pair of lenses and positioning said secured pair of lenses along said second optical axis.

4. The instrument as set forth in claim 3, wherein each of said third and fourth lens carriers include means for guiding said carrier along said second rod and an arm for engaging said first rod to prevent rotation of said third and fourth carriers relative to said second rod.

5. The instrument as set forth in claim 4, wherein said biasing means include a first spring supported between said first and third carriers and a second spring secured between said second and fourth carriers, each of said first and second springs being connected to said respective carriers at locations whereby each of said springs exists a force on each of said carriers to bias said carrier into its respective rod and said respective carrier arm into its respective rod.

6. The instrument as set forth in claim 5, wherein said support rods converge and said carrier arms slide across said rods as they slide along said rods.

7. The instrument as set forth in claim 3, wherein said means for moving said lens carriers includes a crank and link mechanism.

8. The instrument as set forth in claim 7, wherein said means for moving said lens carriers includes a crank having first and second arms, means supported by said support means for rotating said crank, first linkage means for coupling said first crank arm with said first and third carriers, second linkages means for coupling said second crank arm with said second and fourth carriers, and means for varying the effective length of one of said first and second linkages means.

9. The instrument as set forth in claim 8, wherein said first linkage means includes a first pair of linkage arms and said second linkage means includes a second pair of linkage arms, said linkage arms being pivotally connected to said respective crank arms and carriers.

10. Mechanism for supporting and moving the zoom lenses in a variably power stereo microscope comprising:
   (a) support means;
   (b) a pair of angularly disposed support members secured to said support means;
   (c) a crank having first and second arms said crank being rotatably mounted to said support means;

(d) first and second pairs of zoom lens assemblies mounted for linear movement relative to each of said support members;

(e) first linkage means for coupling said first crank arm and said first pair of zoom lens assemblies;

(f) second linkage means for coupling said second crank arm and said second pair of zoom lens assemblies; and (g) means, secured between said first and second pairs of zoom lens assemblies, for biasing said first and second pairs of zoom lens assemblies to said support members.

11. The mechanism as set forth in claim 10, wherein said biasing means comprises a resilient member mounted between said first zoom lens assemblies and a resilient member mounted between said second zoom lens assemblies.

12. The mechanism as set forth in claim 11, wherein said resilient members comprise a compression spring mounted between said first zoom lens assemblies and a tension spring mounted between said second zoom lens assemblies.

13. The mechanism as set forth in claim 10, wherein said zoom lens assemblies include means thereon for guiding said zoom lens assemblies with respect to said support members and each other.

14. The mechanism as set forth in claim 13, wherein said guiding means comprises bars extending from each of said zoom lens assemblies supported by one of said pair of support members to engage one of said other pair of support members.

15. A crank and link mechanism for moving the zoom lenses in a variable power optical instrument, said mechanism comprising:

(a) housing means;

(b) a support member;

(c) a crank having first and second arms, said crank being supported by said housing for rotation between first and second positions, said first crank arm having a cam surface formed thereon;

(d) first and second zoom lens assemblies mounted for linear movement along said support member;

(e) first linkage means coupled by pivot pins to said first crank arm and said first zoom assembly, said pivot pin coupling said first crank arm to said first linkage means being received within a slot formed in said first linkage, said first linkage means further including a cam follower for engagement with said cam surface on said first crank arm; and (f) second linkage means coupled by pivot pins to said second crank arm and said second zoom assembly whereby rotation of said crank in either direction imparts an oscillatory movement to said first linkage means, and to said first zoom assembly to which it is connected, due to the interaction between said cam follower and said cam surface, the oscillatory movement thereby compensating for and correcting out of focus conditions over the zoom range of variable power optical instrument.

16. The crank and link mechanism as set forth in claim 15, further including means for varying the effective length of said second linkage means as said second zoom asssembly is moved by said second arm and said second linkage means.

17. The crank and link mechanism as set forth in claim 15, further including means for varying the effective length of said second linkage means as said second zoom assembly is moved by said second arm and said second linkage means.

18. The crank and link mechanism as set forth in claim 15 and further including means for biasing said first linkage means to said first zoom assembly.

19. The crank and link mechanism as set forth in claim 18 wherein said biasing means comprises a spring mounted between said pivot pins coupling said first zoom assemblies with said first linkage means.

* * * * *